United States Patent [19]

Press

[11] 4,016,614
[45] Apr. 12, 1977

[54] COMBINED REAMER AND SCREWDRIVER

[76] Inventor: Henry Press, 3-14 Lyncrest Ave., Fair Lawn, N.J. 07410

[22] Filed: Apr. 29, 1975

[21] Appl. No.: 572,637

[52] U.S. Cl. .......................... 7/14.1 R; 15/236 R; 408/211; 7/1 F

[51] Int. Cl.² .................................. B25F 1/00

[58] Field of Search ............. 7/14.1 R, 1 F; 145/50 R; 408/200, 211; 15/104.03, 104.04, 104.05, 236

[56] References Cited

UNITED STATES PATENTS

| | | | |
|---|---|---|---|
| 537,246 | 4/1895 | Stone | 145/50 R |
| 878,224 | 2/1908 | Meisselbach et al. | 145/50 R |
| 903,549 | 11/1908 | Dodd | 145/50 R |
| 2,196,701 | 4/1940 | Homsher | 408/211 |
| 2,575,779 | 11/1951 | Young | 7/14.1 R |
| 3,138,044 | 6/1964 | Olexson | 408/200 |
| 3,763,510 | 10/1973 | Graham | 408/211 |

Primary Examiner—Al Lawrence Smith
Assistant Examiner—Roscoe V. Parker, Jr.
Attorney, Agent, or Firm—Berman, Aisenberg & Platt

[57] ABSTRACT

A combination screwdriver and reamer has a blade with edge means for deburring the internal diameter of cut conduit or tubing. An effective tool is provided to serve as a general purpose screwdriver having the added reaming or deburring capacity. The tool is constructed so that the reaming or deburring structure does not interfere with the screwdriver function.

8 Claims, 5 Drawing Figures

U.S. Patent      April 12, 1977      4,016,614
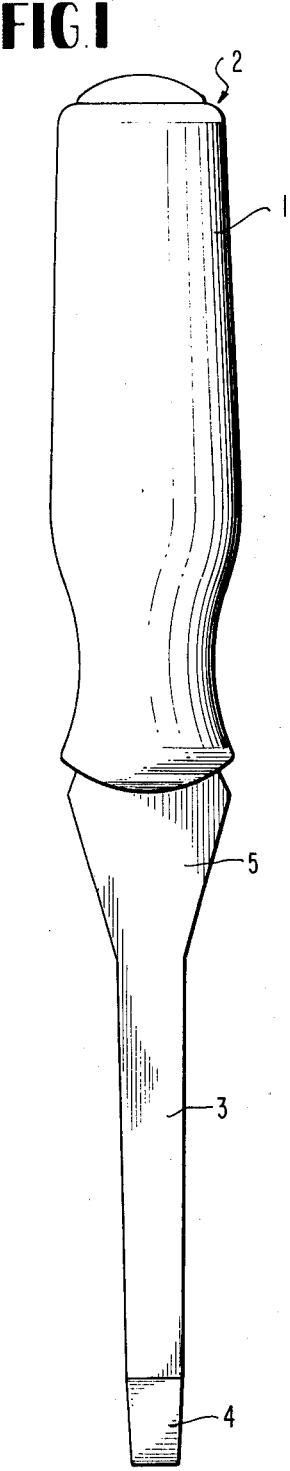
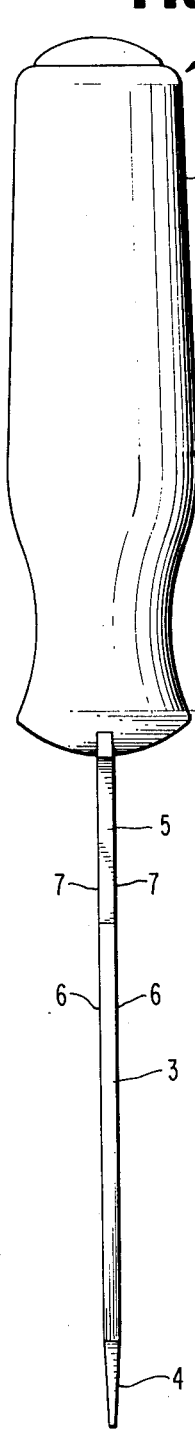
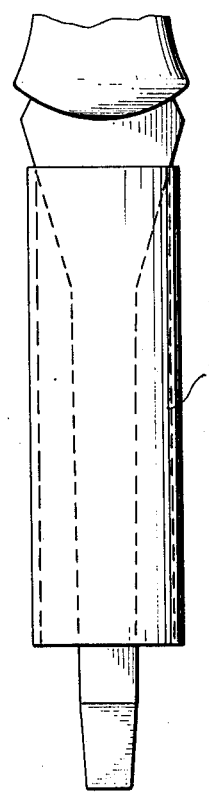
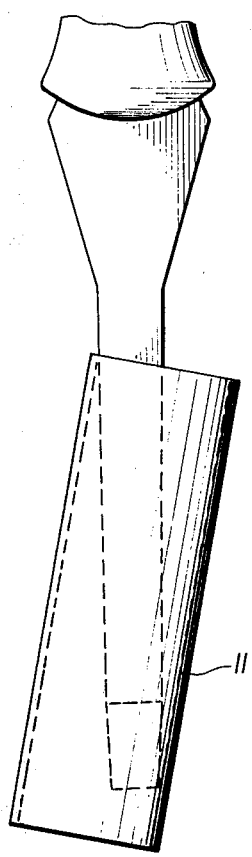
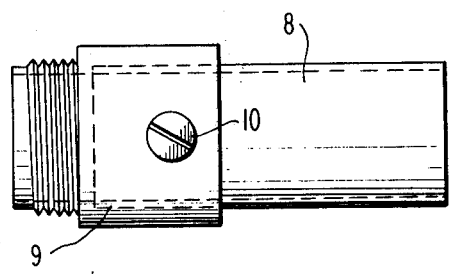

COMBINED REAMER AND SCREWDRIVER

BACKGROUND OF THE INVENTION a. Field of the Invention

Electricians who install electrical wires and cables within metallic and non-metallic conduits generally employ readily-available means, such as a hacksaw, for cutting the conduits to desired lengths. Some means is desired to deburr resulting ragged conduit edges or to ream the newly-cut conduit end. There is a particular need to deburr the inside edges to prevent removal of impairment of the insulation surrounding wires passed therethrough. With regard to fitting conduit sections and particularly connecting them to electrical junction boxes, a screwdriver is required. To avoid having to change tools, it is most useful to have a single tool which serves as both a screwdriver and a reamer or deburrer.

b. Description of the Prior Art

An electrician's combined wrench and reamer is disclosed by Young (U.S. Pat. No. 2,575,779). Young's tool is in the form of a flat bar, the reaming portion of which is severly limited with respect to the size of conduit for which it can be used to service. Olexson (U.S. Pat. No. 3,138,044) discloses an attachment for a screwdriver (or other tool) which is designed to ream and deburr. The attachment must be made to size to fit (wrap around) the screwdriver shaft. The metal from which it is made must have sufficient "give" to permit it to be tightened against the screwdriver shaft. A rather complex assembly of movable blades is provided by Graham (U.S. Pat. No. 3,763,510) to serve the electricial as a combination reamer and screwdriver.

These patents reflect efforts over a period of 25 years to satisfy a need for a practical and simple tool.

SUMMARY OF THE INVENTION

A combined screwdriver and reamer or deburrer is provided with no moving or movable parts. The only two parts, the handle and blade, are fixed to form a unitary tool. The blade serves both as a screwdriver and as a reamer or deburrer. According to a preferred embodiment the portion of the blade closest to the handle widens, ordinarily to a width slightly in excess of one inch (2.54 cm).

An object of this invention is to provide a one-piece unitary tool which is a screwdriver-reamer with no movable or removable parts or attachments. A further object is for the tool to be a general-purpose and high-quality screwdriver which is useful virtually wherever the use of a screwdriver is called for, thus eliminating the need for carrying a screwdriver as a tool separate and distinct from a reamer or deburrer. Another object is to provide a practical tool at a minimum cost for an electrician or other mechanic who has use for both a deburrer and a screwdriver. A still further object is to provide a tool which is easy to handle, which has a convenient size and practical shape and which will readily fit in a mechanic's tool pouch or pocket. One aspect of the invention provides for a tool which is readily "touched up" on a grindstone by any mechanic when edges become dull. It is an object for the invention to provide a reaming tool which will accommodate any size tubing from one-half inch to one and one-half inches in internal diameter or even larger. Still further objects will be appreciated from the description which follows.

BRIEF DESCRIPTION OF THE INVENTION

FIG. 1 is a front view of the tool.

FIG. 2 is a side view of the tool.

FIG. 3 is a front partial view of the tool in position to deburr conduit having a diameter less than the maximum width of the tool blade.

FIG. 4 is a front partial view of the tool in position to deburr conduit having a diameter in excess of the maximum width of the tool blade.

FIG. 5 is a top view of conduit with a connector (for a junction box) attached to one end.

DETAILS

A unitary tool with no moving parts consists of a blade and a handle firmly fixed together. The blade gradually widens in the portion closest to the handle, as shown in FIGS. 1 and 2.

The handle 1 of the tool 2 is of any convenient form of any suitable material. The form and material are generally those ordinarily used for quality screwdrivers. Rubber, plastic, wood or combinations thereof are conveniently employed for the handle, but these are only illustrative. The handle is preferably shaped so as to provide a firm gripping means. It is essentially permanently fixed to the blade 3.

The shaft of the blade can have other cross sections, e.g., square, hexagonal or triangular, useful for screwdriver shafts. It is preferably a single stamping from stock sheet steel, however. One-eighth inch tool steel stock is particularly useful for this purpose. The width of the shaft is not critical, and a width of about three-eighths of an inch is suitable for most purposes. The thickness of the end 4 of the shaft is shaped, e.g., by grinding to serve as a screwdriver. The width of the end 4 can be varied, e.g., by grinding to suit the needs of any particular job.

Throughout this disclosure all references to the blade are to the exposed portion thereof, i.e. the effective length extending from the handle to the end which serves as a screwdriver. References to the shaft are to that portion of the blade which has an essentially uniform cross section. It is fully appreciated that, in fabrication, a unitary continuation of what is herein referred to as the blade will generally extend into the handle to provide means for providing a sturdy tool and for forming a strong bond between the blade and the handle.

The portion of the blade 5 adjacent the handle and remote from the end 4 widens toward the handle to a width which is preferably slightly in excess of one inch and suitable for deburring cut conduit having a one-inch internal diameter. The manner in which the blade widens is preferably, but not necessarily, symmetrical; it can be in a concave, convex or linear form, the latter being illustrated in FIG. 1 and being preferred. The angle at which the blade widens is not critical; it can vary from as little as 4° (per side) to as much as 45° (per side), but the preferred range is from about 9° to about 22° per side or a total of from about 18° to about 45°.

Although the blade can widen virtually continuously from the end 4 to the juncture of the blade with the handle, it is preferred to have a material portion of the blade of virtually uniform width.

The handle and the blade may each be about 4.5 inches in length or may vary to suit the user. Any conventional handle is satisfactory, and the blade should be designed to meet the needs of the mechanic and the particular job at hand.

The blade should be of a hard, tool-quality metal, preferably hardened tool steel. Although case-hardened steel can be employed, it is preferrred to have a metal which is virtually uniformly hard throughout so that grinding, e.g. to sharpen or to adjust the size of the screwdriver bit, will not expose material of lesser hardness. The metal blade should not be brittle because mechanics tend to use screwdrivers for many varied tasks, including prying.

When the blade 3 is stamped from one-eighth inch tool steel stock, production is facilitated and costs are minimized. The stamped blades are preferably hardened prior to attachment to their respective handles. The resulting tool 2 has the distinct advantage of providing a reamer throughout the entire length of the blade as long as edges 6 of the shaft and edges 7 of the widening portion of the blade (as shown in FIG. 2) are kept sharp, i.e. maintained square. These edges are easily sharpened from time to time by grinding.

When a conduit or tube 8 is cut with a hacksaw, the cut edge is left with burrs which readily tear or remove insulation on wire threaded therethrough. Couplings, such as coupling 9 in FIG. 5, ordinarily provide protection against burrs on the outer edge of a cut conduit, but unless internal burrs are removed, wiring will often be damaged. It is thus important to smooth the inner edge of cut tubing, and this is accomplished with the present tool in the manner illustrated in FIG. 3 for tubing 8 which has an internal diameter of at most one inch and in FIG. 4 for tubing 11 which has an internal diameter in excess of one inch. As shown in FIG. 4, considerable leverage is obtained for deburring the inner edge of cut conduit having a diameter in excess of the maximum blade width.

After the inner cut edge is smoothed, that end of the conduit 8 can be inserted into an appropriate coupling 9 for attachment, e.g., to a suitable junction box. When the tube end and coupling are assembled, the tool is useful to tighten screw 10.

By having the blade stamped from sheet tool steel and hardened, a quality combination screwdriver and reamer is available at the same or at a lower cost than presently marketed screwdrivers of corresponding quality. The tool readily serves as a general-purpose screwdriver since the reamer structure does not in any way impair the screwdriver use. It is not a specialized gadget of limited application.

The invention and its advantages are readily understood from the preceding description. Various changes may be made in the form and construction without departing from the spirit and scope of the invention or sacrificing its material advantages. The forms hereinbefore described and/or illustrated in the drawings are merely indicative of preferred embodiments.

What is claimed is:

1. A combination tool which is both a screwdriver and a reamer or deburrer, which consists essentially of a handle and a blade which are unitary and essentially permanently fixed with respect to each other, which is free from moving or movable parts, said blade being of hard-tool quality metal; said blade having a widening portion adjacent the handle and an elongated shaft portion extending from the widening portion; sharp edge means formed along the entire length of said portions for reaming or deburring internal edges of cut conduit or tubing; and a screwdriver bit formed on the blade at the end of the shaft portion which is remote from the handle.

2. A combination tool according to claim 1 wherein the blade is composed of tool steel, the portion of the blade which widens does so gradually and at an effective overall rate of at most about two inches per linear inch of blade.

3. A combination tool according to claim 2 wherein the shaft portion is essentially uniform in cross section.

4. A combination tool according to claim 3 wherein the shaft portion of essentially-uniform cross section extends over a major length of the blade.

5. A combination tool according to claim 4 wherein the tool-steel blade is hardened tool steel.

6. A combination tool according to claim 5 wherein the portion of the blade adjacent the handle widens linearly to a maximum width in excess of one inch.

7. A combination tool according to claim 6 wherein the blade consists essentialy of a hardened tool-steel-stock stamping.

8. A combination tool according to claim 7 wherein the blade is hardened throughout its cross section.

* * * * *